United States Patent
Heiman

(10) Patent No.: US 7,736,574 B2
(45) Date of Patent: Jun. 15, 2010

(54) PERLITE COMPOSITION AND METHOD OF MAKING THE SAME

(76) Inventor: Michael Heiman, 532 SE. Battery Dr., Lee's Summit, MO (US) 64063

( * ) Notice: Subject to any disclaimer, the term of this patent is extended or adjusted under 35 U.S.C. 154(b) by 545 days.

(21) Appl. No.: 11/554,289

(22) Filed: Oct. 30, 2006

(65) Prior Publication Data
US 2007/0112098 A1   May 17, 2007

Related U.S. Application Data

(60) Provisional application No. 60/733,156, filed on Nov. 3, 2005.

(51) Int. Cl.
*B28B 3/00* (2006.01)
(52) U.S. Cl. .................. 264/333; 106/DIG. 2; 427/427
(58) Field of Classification Search ............ 106/DIG. 2; 264/333; 427/427
See application file for complete search history.

(56) References Cited

U.S. PATENT DOCUMENTS

| | | | |
|---|---|---|---|
| 2,463,927 A * | 3/1949 | Watts | |
| 2,727,827 A * | 12/1955 | Chertkof | |
| 2,858,227 A | 10/1958 | Rodsky et al. | |
| 2,861,004 A * | 11/1958 | Sucetti | |
| 3,847,633 A | 11/1974 | Race | |
| 4,042,406 A | 8/1977 | Gray | |
| 4,043,826 A * | 8/1977 | Hum | |
| 4,159,302 A | 6/1979 | Greve et al. | |
| 4,304,704 A | 12/1981 | Billings | |
| 4,613,627 A | 9/1986 | Sherman et al. | |
| 4,689,358 A * | 8/1987 | Schorr et al. | |
| 4,840,672 A * | 6/1989 | Baes ..................... | 106/716 |
| 5,111,627 A | 5/1992 | Brown | |
| 5,256,222 A * | 10/1993 | Shepherd et al. | |
| 5,514,430 A | 5/1996 | Andersen et al. | |
| 5,647,180 A | 7/1997 | Billings et al. | |
| 5,795,380 A | 8/1998 | Billings et al. | |
| 5,942,562 A | 8/1999 | Billings | |
| 6,230,409 B1 | 5/2001 | Billings et al. | |
| 6,248,812 B1 * | 6/2001 | Symons ................... | 524/2 |
| 6,290,469 B1 | 9/2001 | Archibald | |

(Continued)

FOREIGN PATENT DOCUMENTS

DE    4426888 A1 *   2/1996

(Continued)

OTHER PUBLICATIONS

DE 4426888 (Kraemer) Feb. 15, 1996, abstract only.*

(Continued)

*Primary Examiner*—Paul Marcantoni
(74) *Attorney, Agent, or Firm*—Hovey Williams LLP

(57) ABSTRACT

Improved methods for the production of lightweight, rigid, insulative perlite/cement solid articles such as bricks (62) are provided wherein expanded perlite is first treated with a cement binder followed by application of cement with subsequent mixing and forming. In preferred forms, a continuous belt (12) is provided with laterally spaced apart stations (22-28) for application of perlite, binder, water and Portland cement, respectively, onto the belt (12); these materials are then mixed in a drum mixer (38) to produce a mixture (61) which is poured into a frame assembly (44) for final curing/hardening.

21 Claims, 1 Drawing Sheet

U.S. PATENT DOCUMENTS

| | | | |
|---|---|---|---|
| 6,355,098 | B1 | 3/2002 | Pfemeter |
| 6,398,976 | B1 * | 6/2002 | Sandoval et al. |
| 6,526,714 | B1 | 3/2003 | Billings et al. |
| 6,557,256 | B2 | 5/2003 | Billings et al. |
| 6,572,697 | B2 | 6/2003 | Gleeson et al. |
| 2003/0055132 | A1 * | 3/2003 | Symons .................. 524/2 |
| 2004/0083677 | A1 | 5/2004 | Bezubic, Jr. et al. |

FOREIGN PATENT DOCUMENTS

| | | | |
|---|---|---|---|
| DE | 19443367 | A1 * | 4/1998 |
| WO | WO 99/56869 | | 11/1999 |

OTHER PUBLICATIONS

KR 2003025361 Mar. 29, 2003 (Chae et al.) abstract only.*
De 19643367 A1 (Kuehn et al.) abstract only.*
Pertite Product Guide, "Perlite in Simulated Stone, Masonry and Wood Products," Perlite Institute, Inc., http://www.perlite.org/guides/pprodgl.htm.
U.S. Asia-Pacific Minerals, Inc.: Manufacturer and Distributor of Expanded Perlite, http://www.usasia-pacific.com/construction.html.
Quikrete Cement & Concrete Products, http://www.quikrete.com.

* cited by examiner

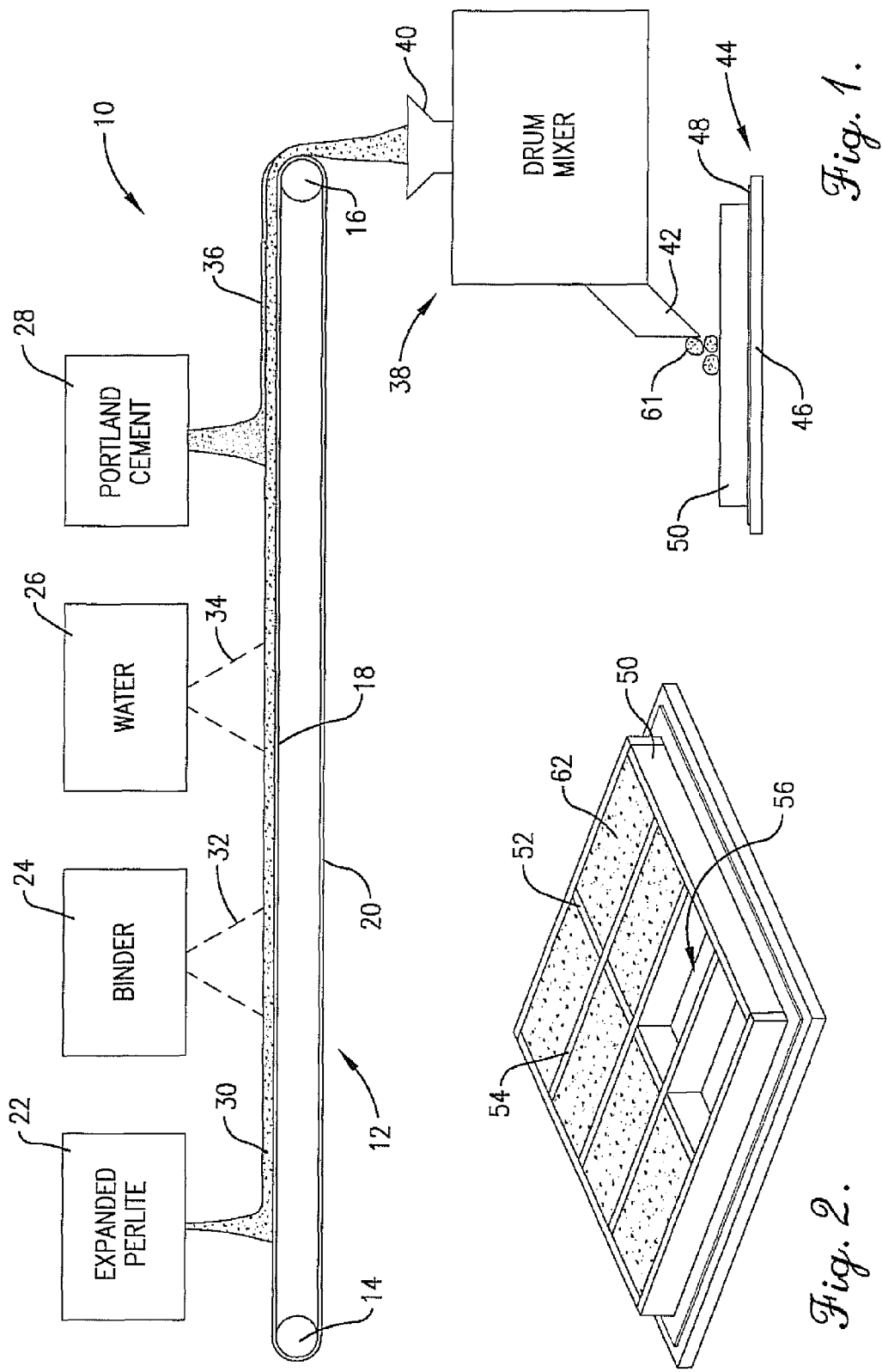

PERLITE COMPOSITION AND METHOD OF MAKING THE SAME

RELATED APPLICATIONS

This application claims the priority benefit of a provisional application entitled PERLITE COMPOSITION AND METHOD OF MAKING THE SAME, Ser. No. 60/733,156, filed Nov. 3, 2005, incorporated by reference herein.

BACKGROUND OF THE INVENTION

1. Field of the Invention

The present invention is broadly concerned with improved methods for the production fo highly desirable solid articles (e.g., sheets, panels, bricks, mold pourings) containing expanded perlite and cement. More particularly, the invention is concerned with such methods wherein expanded perlite is first treated by application of cement binder, followed by mixing of cement with the treated perlite to form a castable or formable mixture.

2. Description of the Prior Art

Perlite is a generic term for naturally occurring siliceous volcanic rock. A distinguishing feature of perlite is that when heated to a suitable point in its softening range, it expands four to twenty times its original volume. This expansion is due to the presence of 2-6% combined water in the crude perlite rock. When quickly heated above 1600° F., the crude rock pops in a manner similar to popcorn as the combined water vaporizes, creating countless tiny bubbles in the heat-softened glassy particles. It is the presence of these tiny glass-sealed bubbles which accounts for the desirable physical properties of expanded perlite. Expanded perlite can be manufactured to weigh from 2-15 lb/cubic foot, making it adaptable for numerous applications in the construction, industrial, chemical, horticultural and petrochemical industries.

Expanded perlite has been used in the past in the fabrication of lightweight building materials and artificial stones. Thus, U.S. Pat. No. 4,043,826 describes a process for making artificial rocks wherein latex paint, water, calcium chloride, Portland cement mid horticultural perlite are mixed together and poured into a flexible mold in the shape of a natural rock. U.S. Pat. No. 3,847,633 is directed to the production of building materials wherein Portland cement and perlite are mixed together along with plaster of paris, fly ash and fiberglass reinforcing material. In the process, dry materials are pre-blended, followed by the addition of water and mixing; the resulting slurry is then formed using a specific, two-stage, differential temperature curing regimen. U.S. Pat Nos. 2,858, 227 and 4,042,046 describe additional variants of these processes for the production of perlite/cement products.

SUMMARY OF THE INVENTION

The present invention provides improved methods for the production of highly useful perlite/cement products such as sheets, panels or bricks. Broadly speaking, the methods of the invention involve first providing a quantity of expanded perlite and treating the perlite by applying a cement binder thereto, so as to at least partially encapsulate the perlite with binder. Thereafter, an amount of cement (preferably Portland cement grades I or III) is added to the binder-treated perlite and a mixture is created. This mixture can then be formed and allowed to harden to yield the final solid articles of the invention. The cement binder is normally an aqueous synthetic resin product and may be used in concentrated or dilute forms. Additional water may also be applied to the binder-treated perlite prior to cement addition as necessary.

It has been found that the order of addition of the starting materials is important, i.e., simultaneous mixing of perlite, binder and cement does not produce the desired products. Rather, it is preferred to first treat the expanded perlite with binder followed by mixing thereof with cement to form the formable mixture.

BRIEF DESCRIPTION OF THE DRAWINGS

FIG. 1 is an essentially schematic, side elevational view of a preferred apparatus used in the fabrication of solid articles in accordance with the invention; and FIG. 2 is an isometric view of a representative form partially filled with the material of the invention, in the final step of the fabrication process.

DETAILED DESCRIPTION OF THE PREFERRED EMBODIMENT

Turning now to the drawing, FIG. 1 illustrates a preferred, in-line apparatus 10 useful in fabricating the solid articles of the invention. Broadly speaking, the apparatus 20 includes a continuous belt 12 trained about endmost rollers 14,16 and presenting an upper run 18 and an opposed, lower run 20. In practice, a belt length of approximately 42 inches has been found to be sufficient.

Additionally, located above run 18 are a series of laterally spaced apart ingredient stations 22,24,26 and 28. The station 22 is designed to hold a supply of expanded perlite and includes a lower outlet designed to deliver a thin layer 30 of perlite (e.g., from about 1/16 to 1/2 inches, more preferably from about 1/8 to 1/4 inches in thickness) onto run 18. The station 24 is designed to distribute liquid cement binder onto the upper surface of layer 30, and preferably is operable to spray the binder through exemplary spray pattern 32. Preferably, the binder is used at a ratio of about 1 part binder to 34 parts perlite (all parts referred to herein are parts by volume). The binder may be as received from the manufacturer, or may be diluted with water.

Although not wishing to be bound by any theory, it is believed that the binder essentially encapsulates the perlite prior to application of cement. Indeed, it has been found that simultaneous mixing of perlite, binder and cement does not produce a satisfactory product. Therefore, the stepwise application of binder and then cement to the perlite is deemed to be important.

The station 26 is similar to station 24, but holds water which is sprayed atop the binder-treated perlite layer 30. Ultimately, the preferred binder/water ratio, whether derived from a mixture of binder and water and/or application of binder followed by water, is about 10 parts water per part of binder. The preferred application is via an exemplary spray pattern 34. Finally, the station 28 is adapted to hold a supply of powdered Portland cement and is further designed to distribute an even layer 36 thereof over the previously treated perlite layer 30. In preferred practice, the cement layer 36 should be applied to achieve a ratio of about 8 parts cement to 34 parts perlite.

The overall apparatus 10 further includes a drum mixer 38 positioned adjacent the output end of belt 12. The schematically depicted mixer 38 includes a inlet hopper 40 and an outlet 42. The purpose of the mixer 30 is to thoroughly mix, aerate if desired, and render essentially homogeneous the perlite, binder, water and cement deposited on belt 12. Although a variety of mixers may be used for this purpose, it has been found that a simple drum provided with internal, helical vanes and powered for rotation via a motor and drive is perfectly suitable. In such a device, the vanes repeatedly lift the material and drop it back towards the base of the drum. Normally, a mixing sequence comprising several material "drops" is adequate to achieve thorough mixing and aeration.

The apparatus 10 also has a form assembly 44 positioned adjacent and below outlet 42. In the example illustrated, the assembly 44 includes a planar base 46 such as a wood or composition panel, with a sheet of flexible plastic 48 positioned atop the base 46. An upright, rigid, wood or metal frame 50 sits on the sheet 48 and may be provided with internal form walls 52,54 so as to define form cavities 56 of desired shape and dimensions.

In the practice of the invention, the expanded perlite may be derived from a number of commercial sources, and would normally have densities corresponding to either horticultural or commercial grade perlite.

The binder is a conventional cement binder, usually in the form of an aqueous dispersion containing a synthetic resin polymer, such as a vinyl acetate/ethylene copolymer and a vinyl alcohol polymer. One commercial product found useful in the context of the invention is QUIKRETE® bonding adhesive, which is a milky white liquid having a melting point of 32° F., a specific gravity from about 1.0-1.2, a boiling point of 212° F., and a vapor pressure of 17 mm Hg at 68° F. Depending upon the desired characteristics in the final mixture, the binder may be applied as received, or can be diluted with water. Current practice is to dilute the binder at a ratio of 1 gallon binder/10 gallons water for use in the station 24. The binder is normally applied to the expanded perlite at a level of from about ¾ to 1½ parts binder per 34 parts of expanded perlite, and more preferably from about 1 part binder per 34 parts.

A variety of cements may be used in the station 28. For reasons of cost and availability, Portland cement is preferred, and usually grade III Portland is used. The cement should be deposited onto belt 12 dry, i.e., not premixed with water. The cement is added to the treated perlite at a level of from about 3-18 parts cement per 34 parts untreated perlite, and more preferably from about 8 parts cement to 34 parts untreated perlite.

As shown in FIG. 1, water may be added with and/or subsequent to application of the binder. Additionally, another application of water may be made downstream of the cement station 28; thus, it will be appreciated that the precise locations where water is added, alone or in combination with the binder, is unimportant, so long as adequate water is used. However added, water should be present at a level of from about 4 to 12 parts of water to 34 parts of untreated perlite, more preferably about 10 parts of water to 34 parts of untreated perlite.

The final forming step permits the initially perlite/binder/water/cement mixture 61 to harden and cure and thereby form the desired final article. As illustrated in FIG. 1, the mixture 61 may have small "clumps" therein, but is generally homogeneous. This is normally accomplished by permitting the formed mixture to cure in ambient air, without any application of pressure. For many products, the curing period will extend for a period of from about 1-4 days, more typically from about 2-3 days. Curing agents can be added to accelerate the curing process, and/or heat drying systems may be used for the same purpose. At the end of the cure period, the completed solid articles can be readily detached from the frame 50. Although the form 50 depicted in the drawing is designed to produce brick-like articles 62, it will be appreciated that the invention is not so limited. Thus, the form 50 can be designed to produce structural panels or shower stall components, or for that matter essentially any solid article.

It will also be appreciated that the concrete/perlite/water mixtures of the invention may be partially or fully premixed and then delivered to a construction site where the mixture may be poured and cured on-site to produce desired articles.

Although not specifically illustrated in the drawing, it will be appreciated that various reinforcing material can be used in fabricating the finished articles of the invention, Such reinforcing materials can be of various types and amounts, such as polyester, fiberglass and/or metal. When used, the reinforcing materials are normally placed within the form cavities 56 prior to or shortly after filling thereof with the mixture 61; alternately, these materials may be added during formulation of the curable cement/perlite/water mixture.

The final products of the invention have a number of highly desirable qualities. Such products are self-insulating owing to the presence of expanded perlite therein, and moreover can withstand direct butane torch flame (approximately 1750° F.) without burning or spreading. As manufactured, the products are normally solid color, but are readily paintable or stainable. The products can be readily cut using hand or power saws, and will accept fasteners such as nails, screws or bolts. The products are moreover easy to repair using conventional filler products.

Products in accordance with the invention in the form of sheets or blocks can be used as internal or external walls, flooring, roofing, counter tops, mantles and fireplace surrounds, shower stalls (walls, floor), columns, pool table slabs, fountains, statuary, urns, swimming pool decking and sheathing, for example. When multiple sheets are used to form walls for buildings, the sheets can be connected using conventional ties, and the cavity between the joined sheets can be filled with concrete, rebar, or additional thermal insulation. The finished walls can then be surfaced inside or outside with hardeners, stucco, cement and/or waterproofing agents, or drywall on interior surfaces. Alternately, the cured articles can be left with their natural surfaces.

The products can also be conformed during the molding process to achieve varying degrees of smoothness and shape. For example, coarser grades of perlite with minimal fines creates a less-dense product, whereas finer perlite gives a denser product and a different surface.

I claim:

1. A method of forming a solid article comprising the steps of:
   providing a quantity of expanded perlite;
   treating said expanded perlite by applying a cement binder and water thereto, said cement binder comprising a vinyl acetate/ethylene copolymer;
   after application of said cement binder, mixing an amount of Portland cement with said treated perlite to form a mixture; and
   forming said mixture and allowing the mixture to harden and form said article.

2. The method of claim 1, said expanded perlite having a density corresponding to commercially available horticultural or commercial grade perlite.

3. The method of claim 1 including the step of applying said binder by spraying a liquid binder onto said expanded perlite.

4. The method of claim 1, said binder including an aqueous dispersion containing said polymer.

5. The method of claim 1, wherein said water is added to said binder prior to said application thereof.

6. The method of claim 1, said binder being applied at a level of from about ¾ to 1½ parts binder per 34 parts of expanded perlite.

7. The method of claim 6, said level being from about 1 part binder per 34 parts expanded perlite.

8. The method of claim 1, including the step of depositing said cement as a powder over a layer of said treated perlite.

9. The method of claim 1, said cement being mixed with said treated perlite at a level of from about 3-18 parts cement per 34 parts untreated perlite.

10. The method of claim 9, wherein said level is from about 8 parts cements per 34 parts untreated perlite.

11. The method of claim 1, wherein said water is added prior to said cement mixing step.

12. The method of claim 11, including the step of adding a level of water from about 4-12 parts water per 34 parts untreated perlite.

13. The method of claim 11, said level being from about 10 parts water per 34 parts untreated perlite.

14. The method of claim 1, in including the step of forming said mixture mixing of said treated perlite and cement.

15. The method of claim 14, said mixing being carried out in a rotatable drum mixer.

16. The method of claim 1, said forming step comprising the step of pouring said mixture into a form, and allowing the mixture to harden in ambient air.

17. The method of claim 16, said hardening being carried out without application of pressure.

18. The method of claim 1, including the steps of:
providing an elongated, shiftable belt;
depositing said expanded perlite onto said belt to form a thin layer thereof;
thereafter applying said cement binder to the upper surface of said thin layer; and
thereafter depositing said cement atop said thin layer to form a composite.

19. The method of claim 18, including the step of directing said composite from said belt into a mixer to thereby form said mixture.

20. The method of claim 1, including the step of adding a reinforcing material to said mixture prior to hardening thereof.

21. The method of claim 20, said reinforcing material selected from the group consisting of polyester, fiberglass, metal and mixtures thereof.

* * * * *